B. W. STRINGFELLOW.
RESILIENT WHEEL.
APPLICATION FILED DEC. 14, 1915.
1,193,733.
Patented Aug. 8, 1916.
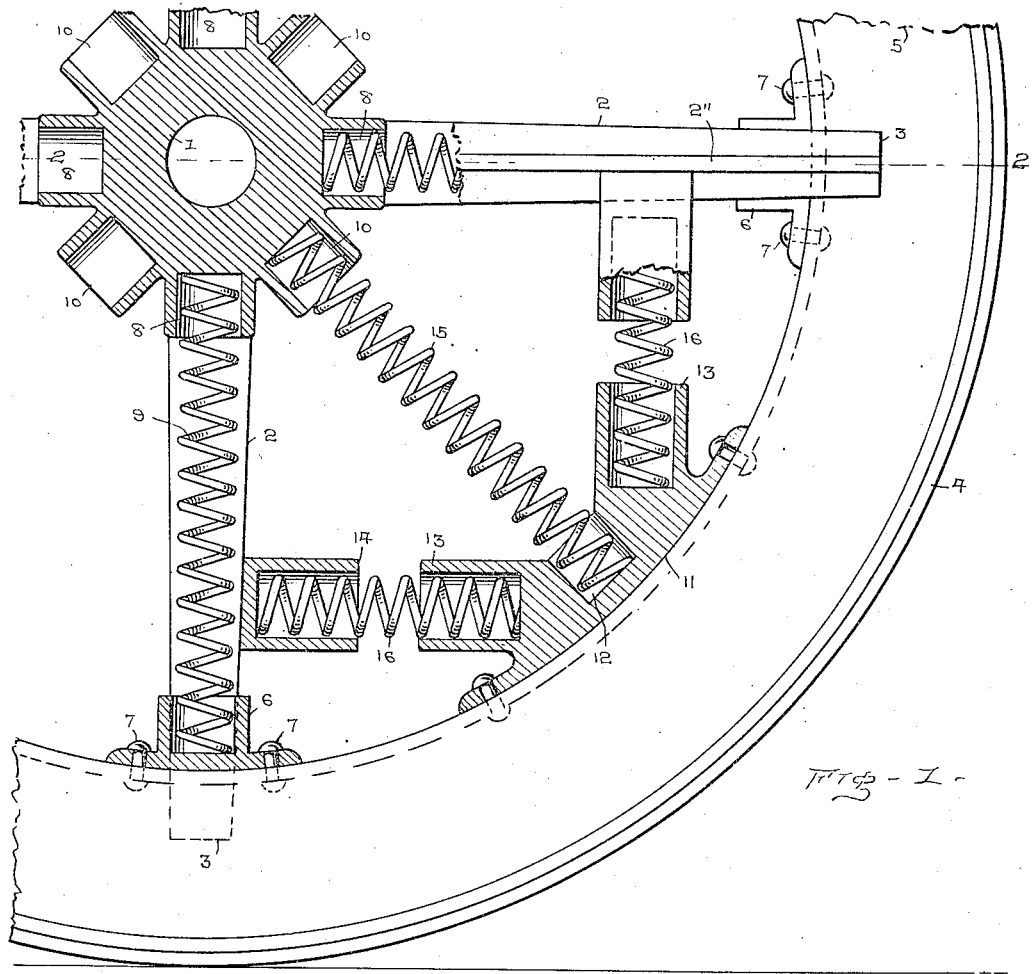
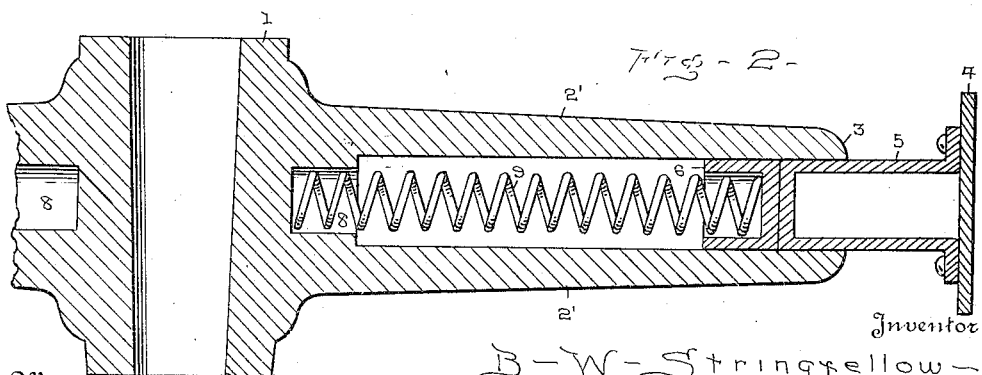
Witness
Thos W Riley
Inventor
B. W. Stringfellow
By Ogle R. Singleton
Attorney

UNITED STATES PATENT OFFICE.

BRUCE WILLIAM STRINGFELLOW, OF ELKWOOD, VIRGINIA, ASSIGNOR OF ONE-FORTIETH TO SEVERN M. NOTTINGHAM, OF CULPEPER, VIRGINIA, AND ONE-FORTIETH TO OGLE R. SINGLETON, OF WASHINGTON, DISTRICT OF COLUMBIA.

RESILIENT WHEEL.

1,193,733.     Specification of Letters Patent.     Patented Aug. 8, 1916.

Application filed December 14, 1915. Serial No. 66,723.

*To all whom it may concern:*

Be it known that I, BRUCE WILLIAM STRINGFELLOW, a citizen of the United States, residing at Elkwood, in the county of Culpeper and State of Virginia, have invented certain new and useful Improvements in Resilient Wheels, of which the following is a specification.

My invention consists in a new and useful improvement in resilient wheels. It is intended more particularly for automobile wheels.

It consists in a novel arrangement of the hub, spokes, rim and the elastic media interposed between the hub, spokes and rim.

The invention is designed to provide a wheel in which the weight imposed by the vehicle and the strain of traction when in motion are evenly distributed throughout the structure of the wheel, thus tending to increase the resistance of the wheel against excessive strain. The construction provides a wheel having such resiliency as to obviate the necessity for a pneumatic or otherwise resilient tire, to properly cushion the vehicle. The structure is so adapted as to offer sufficient protection to prevent undue lateral movement by the rim, thus constantly securing the wheel in a properly vertical position.

The invention consists in the details of construction hereinafter pointed out.

In the drawings: Figure 1 is a side elevation, partly in section, of a portion of a wheel embodying the invention. Fig. 2 is a sectional view, on line 2—2 of Fig. 1.

In these drawings, the numeral 1 designates a hub, from which radiate spokes 2, composed of lateral walls 2' and provided with supporting ribs 2'', and having ends 3. Surrounding the ends 3, is the rim 4 of any ordinary type suitable for the publication of a solid tire of the usual type. Attached to the inner side of the rim 4 is the felly 5, passing between the lateral walls 2' of the spokes 2. Spring bearing cups 6, located between the lateral walls 2', adjacent to the felly 5, are connected therewith by bolts 7. At the ends of the spokes 2, adjacent to the hub 1, between the lateral walls 2', are located spring bearing cups 8. Interposed between the cups 6 and 8, having their ends bearing therein, are the helical springs 9, under slight compression. Located upon the periphery of the hub 1, interposed between the spoke 2, and concentric therewith, are the spring bearing cups 10. Affixed to the inner side of the felly 5, at points equi-distant from the ends 3 of adjacent spokes 2, are located plates 11, having spring bearing cups 12, each cup having its axis in line with the axis of its opposite cup 10. The plates have also pairs of spring bearing cups 13, one on each side of the cup 12, each cup 13 having its axis at right angles to its adjacent spoke 2. Spring bearing cups 14 are located upon the sides of the spokes 2, affixed to the lateral walls 2'. Each cup 14 has its axis in line with its adjacent cup 13. Interposed between the cups 10 and 12, having their ends bearing therein, are helical springs 15, under slight compression. Interposed between the cups 13 and 14, having their ends bearing therein, are the helical springs 16, under slight compression.

Having described my invention, what I claim is:

1. A wheel, having a hub, radial spokes integral therewith and provided with forked ends, a rim carried between the sides of the forked ends by resilient connections directly with the hub, within the spokes, resilient connections bearing upon the rim at one end and directly upon the hub at the other end, such connections alternating with the connections within the spokes, and a single resilient connection between each side of each spoke and the rim.

2. A wheel, having a hub, radial spokes integral therewith and provided with forked ends, a rim carried between the sides of the forked ends by resilient connections directly with the hub, within the spokes, resilient connections bearing upon the rim at one end and directly upon the hub at the other end, such connections alternating with the connections within the spokes, and a single resilient connection between each side of each spoke and the rim, such connections being adapted at right angles to the line of each spoke.

3. The combination in a spring wheel of a hub, radial spokes integral therewith provided with forked ends, a rim provided with a felly, passing through the forked ends of the spokes and seated upon helical springs within the spokes bearing upon the hub, and provided with bearing plates, interposed between the spokes, having helical springs bearing upon the hub and helical springs bearing against the sides of the spokes.

In testimony whereof I affix my signature in the presence of two witnesses.

BRUCE WILLIAM STRINGFELLOW.

Witnesses:
S. M. NOTTINGHAM,
E. NOTTINGHAM, Jr.

Copies of this patent may be obtained for five cents each, by addressing the "Commissioner of Patents, Washington, D. C."